(No Model.)

L. C. THATCHER.
NUT LOCK.

No. 291,811. Patented Jan. 8, 1884.

Attest:
Robert Burns
A. Campbell

Inventor:
Lewis C. Thatcher
per
Smalley & Burns
Attorneys.

UNITED STATES PATENT OFFICE.

LEWIS C. THATCHER, OF CHICAGO, ILLINOIS.

NUT-LOCK.

SPECIFICATION forming part of Letters Patent No. 291,811, dated January 8, 1884.

Application filed November 22, 1883. (No model.)

*To all whom it may concern:*

Be it known that I, LEWIS C. THATCHER, a citizen of the United States, and a resident of Chicago, in the county of Cook and State of Illinois, have invented a certain new and useful Improvement in Nut-Locks; and I do hereby declare the following to be a full, clear, and exact description of the same, reference being had to the accompanying drawings, forming a part of this specification.

My invention relates to improvements in that class of nut-locks in which the screw-threaded end of the bolt is slitted, so as to permit of such end being spread or expanded to hold or lock the nut in the desired position and prevent unscrewing of the same in use; and my improvement has for its object to provide a ready means for forming a lock between the nut and bolt, and at the same time admit of the removal and ready reuse of the same when required. I attain this object by the construction illustrated in the accompanying drawings, in which—

Figure 1:
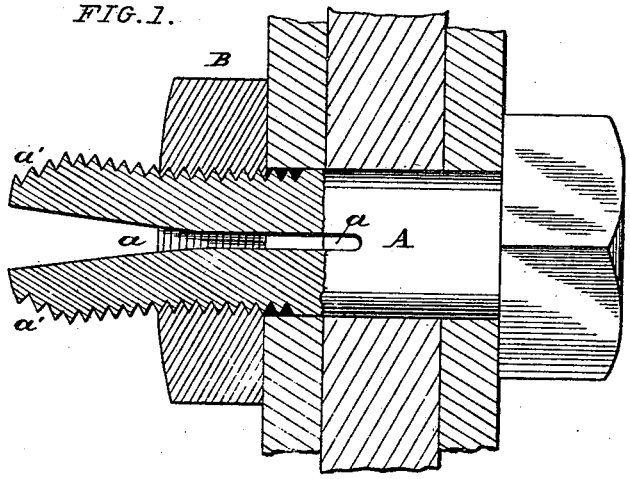
Figure 2:
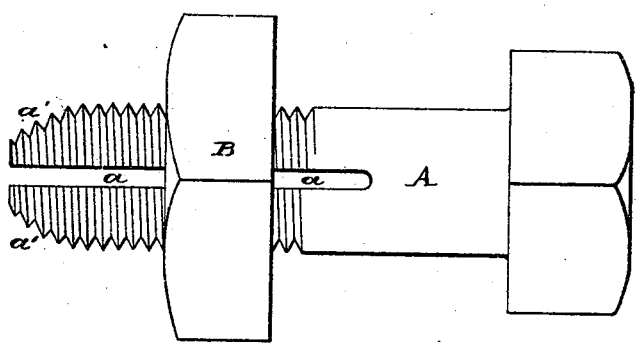

Figure 1 is a vertical section, partly in elevation, illustrating my improvement adapted to the fish-plate joint of a railway-rail, the nut being shown locked upon the bolt; and Fig. 2 an elevation of the nut and bolt before being locked.

In the present construction the bolt A is formed with one or more longitudinal slits, $a$, so as to permit of the portions thus formed being permanently spread apart to lock the nut B in place upon the bolt at the required position, and prevent the jarring loose or unscrewing of the same in use. In my present invention I form the end $a'$ of the bolt of a tapering or conical form, which is properly screw-threaded, the purpose being to enable the nut to be easily reapplied after having been forcibly unscrewed by furnishing a screw-threaded point of reduced diameter, or one less than the screw-threaded hole in the nut, for the nut to engage in reusing the parts and reforming the lock.

In Fig. 2 I show the construction of the bolt before use, and in Fig. 1 the application of the same to a fish-plate joint, with the split portions of the bolt expanded to lock the nut in place.

Having thus fully described my invention, what I claim as new, and desire to secure by Letters Patent, is—

1. As an improved article of manufacture, a bolt formed with a tapering screw-threaded point, $a'$, and longitudinal slit or slits $a$, essentially as described, and for the purpose set forth.

2. The combination, in a nut-locking device, of the nut B and bolt A, having longitudinal slit or slits $a$ and a tapering screw-threaded point, $a'$, as described, and for the purpose set forth.

In testimony whereof witness my hand this 19th day of November, 1883.

LEWIS C. THATCHER.

In presence of—
ROBERT BURNS,
H. D. SMALLEY.